United States Patent
Iwanaga et al.

(10) Patent No.: US 8,077,445 B2
(45) Date of Patent: *Dec. 13, 2011

(54) MONOLITHIC CERAMIC ELECTRONIC COMPONENT AND METHOD FOR MANUFACTURING THE SAME

(75) Inventors: Toshiyuki Iwanaga, Sabae (JP); Akihiro Motoki, Fukui (JP); Makoto Ogawa, Fukui (JP); Kenichi Kawasaki, Echizen (JP); Shunsuke Takeuchi, Echizen (JP); Seiichi Nishihara, Kameoka (JP); Shuji Matsumoto, Omihachiman (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 72 days.

This patent is subject to a terminal disclaimer.

(21) Appl. No.: 12/405,370

(22) Filed: Mar. 17, 2009

(65) Prior Publication Data

US 2009/0280319 A1    Nov. 12, 2009

(30) Foreign Application Priority Data

May 12, 2008  (JP) .................................. 2008-125004

(51) Int. Cl.
    *H01G 4/00*    (2006.01)
(52) U.S. Cl. ....................... 361/309; 361/305; 361/308.1
(58) Field of Classification Search ....... 361/303–308.1, 361/305, 309
    See application file for complete search history.

(56) References Cited

U.S. PATENT DOCUMENTS

| | | | |
|---|---|---|---|
| 4,701,827 A * | 10/1987 | Fujikawa et al. | 361/309 |
| 5,426,560 A * | 6/1995 | Amaya et al. | 361/309 |
| 5,835,339 A * | 11/1998 | Sakamoto et al. | 361/321.2 |
| 6,295,196 B1 * | 9/2001 | Hamaji et al. | 361/321.2 |
| 6,320,738 B1 * | 11/2001 | Yamana et al. | 361/321.2 |
| 6,356,430 B1 * | 3/2002 | Yoshida et al. | 361/305 |
| 6,400,553 B2 * | 6/2002 | Yoshii et al. | 361/321.2 |
| 6,510,040 B1 * | 1/2003 | Sato et al. | 361/321.4 |
| 6,522,521 B2 * | 2/2003 | Mizuno et al. | 361/321.4 |
| 6,606,238 B1 * | 8/2003 | Nakamura et al. | 361/321.2 |
| 6,663,798 B2 * | 12/2003 | Sato et al. | 252/512 |
| 6,704,189 B2 * | 3/2004 | Yoshii et al. | 361/308.1 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |

(Continued)

FOREIGN PATENT DOCUMENTS

JP    63-169014 A    7/1988

OTHER PUBLICATIONS

Iwanaga et al.; "Multilayer Ceramic Electronic Component and Method for Producing Same"; U.S. Appl. No. 12/405,372, filed Mar. 17, 2009.

(Continued)

*Primary Examiner* — Cathy Lam
(74) *Attorney, Agent, or Firm* — Keating & Bennett, LLP

(57) ABSTRACT

A method for manufacturing a monolithic ceramic electronic component includes a plating substep of depositing precipitates primarily composed of a specific metal on an end of each of internal electrodes exposed at a predetermined surface of a laminate and growing the precipitates to coalesce into a continuous plated layer, wherein the specific metal is different from that of the internal electrodes, and the same or substantially the same metal that defines the internal electrodes is distributed throughout the plated layer.

3 Claims, 5 Drawing Sheets

U.S. PATENT DOCUMENTS

| | | | |
|---|---|---|---|
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,324,326 B2 * | 1/2008 | Suzuki et al. | 361/321.1 |
| 7,344,981 B2 | 3/2008 | Ritter et al. | |
| 7,345,868 B2 | 3/2008 | Trinh | |
| 7,388,739 B2 * | 6/2008 | Abe et al. | 361/321.1 |
| 7,463,474 B2 | 12/2008 | Ritter et al. | |
| 7,518,848 B2 * | 4/2009 | Suzuki et al. | 361/321.1 |
| 7,576,968 B2 * | 8/2009 | Ritter et al. | 361/306.3 |
| 7,580,241 B2 * | 8/2009 | Sakashita | 361/313 |
| 7,589,951 B2 * | 9/2009 | Kunishi et al. | 361/306.3 |
| 7,589,952 B2 * | 9/2009 | Motoki et al. | 361/306.3 |
| 7,595,974 B2 * | 9/2009 | Nakano et al. | 361/321.4 |
| 2005/0046536 A1 | 3/2005 | Ritter et al. | |
| 2008/0123248 A1 | 5/2008 | Kunishi et al. | |
| 2008/0158774 A1 | 7/2008 | Trinh | |

OTHER PUBLICATIONS

Ogawa et al.; "Monolithic Ceramic Electronic Component and Method of Manufacturing Monolithic Ceramic Electronic Component"; U.S. Appl. No. 12/405,405, filed Mar. 17, 2009.

Ogawa et al.; "Ceramic Electronic Component and Method for Manfacturing the Same"; U.S. Appl. No. 12/405,399, filed Mar. 17, 2009.

Ogawa et al.; "Ceramic Electronic Component and Method for Manfacturing the Same"; U.S. Appl. No. 12/356,561, filed Jan. 21, 2009.

Motoki et al., "Multilayer Electronic Component and Method for Manufacturing the Same", U.S. Appl. No. 12/110,484, filed on Apr. 28, 2008.

Motoki et al., "Multilayer Ceramic Electronic Component and Method for Manufacturing the Same", U.S. Appl. No. 12/356,648, filed on Jan. 21, 2009.

Kayatani et al., "Multilayer Ceramic Electronic Component and Method for Making the Same", U.S. Appl. No. 12/469,799, filed on May 21, 2009.

Takeuchi et al., "Multilayer Ceramic Electronic Component and Manufacturing Method Thereof", U.S. Appl. No. 12/340,570, filed on Dec. 19, 2008.

Nishihara et al., "Laminated Ceramic Electronic Component and Manufacturing Method Thereof", U.S. Appl. No. 12/617,879, filed on Nov. 13, 2009.

Kobayashi et al., "Multilayer Ceramic Electronic Component and Method for Making the Same", U.S. Appl. No. 12/490,471, filed on Jun. 24, 2009.

Takeuchi et al., "Multilayer Electronic Component and Method for Manufacturing the Same", U.S. Appl. No. 12/817,352, filed on Jun. 17, 2010.

Saruban et al., "Laminated Ceramic Electronic Component and Manufacturing Method Therefor", U.S. Appl. No. 12/821,305, filed on Jun. 23, 2010.

* cited by examiner

MONOLITHIC CERAMIC ELECTRONIC COMPONENT AND METHOD FOR MANUFACTURING THE SAME

BACKGROUND OF THE INVENTION

1. Field of the Invention

The present invention relates to a monolithic ceramic electronic component and a method for manufacturing the monolithic ceramic electronic component and, in particular, to a monolithic ceramic electronic component in which external electrodes are directly formed on the surface of a laminate by plating and a method for manufacturing the monolithic ceramic electronic component.

2. Description of the Related Art

As illustrated in FIG. 5, a monolithic ceramic electronic component 101, such as a monolithic ceramic capacitor, includes a laminate 102, which includes ceramic layers 103 and internal electrodes 104 and 105 alternately disposed between the ceramic layers 103. An end of each of the internal electrodes 104 is exposed at an end surface 106 of the laminate 102. An end of each of the internal electrodes 105 is exposed at an end surface 107. External electrodes are provided on the end surfaces 106 and 107 to electrically connect the corresponding ends of the internal electrodes 104 and 105.

In general, the external electrodes are formed as follows: first, a metal paste including a metal component and a glass component is applied to the end surfaces 106 and 107 of the laminate 102 and is baked to form paste electrode layers 108 and 109. First plated layers 110 and 111 made primarily of, for example, Ni, are then formed on the paste electrode layers 108 and 109. Second plated layers 112 and 113 made primarily of, for example, Sn, are then formed on the first plated layers 110 and 111. Thus, the external electrodes include the paste electrode layers 108 and 109, the first plated layers 110 and 111, and the second plated layers 112 and 113.

The external electrodes are required to have excellent solder wettability so that the monolithic ceramic electronic component 101 can be soldered to a substrate. The external electrodes are also required to electrically connect the corresponding internal electrodes, which are insulated from each other. The second plated layers 112 and 113 provide excellent solder wettability to the monolithic ceramic electronic component 101. The paste electrode layers 108 and 109 electrically connect the internal electrodes 104 and 105. The first plated layers 110 and 111 prevent solder leaching.

However, the paste electrode layers 108 and 109 have a thickness of several tens to several hundreds of micrometers. Thus, in a monolithic ceramic electronic component 101 having a given specified volume, the paste electrode layers 108 and 109 disadvantageously reduce the effective volume for capacitance. In contrast, the first plated layers 110 and 111 and the second plated layers 112 and 113 have a thickness off only several micrometers. Accordingly, if the external electrodes include only the plated layers, the effective volume for capacitance can be increased.

For example, Japanese Unexamined Patent Application Publication No. 63-169014 discloses a method for depositing an electroconductive metal layer by electroless plating on side surfaces of a laminate at which internal electrodes are exposed so that the exposed internal electrodes are connected to each other.

An example of a monolithic ceramic electronic component described in Japanese Unexamined Patent Application Publication No. 63-169014 is a monolithic ceramic capacitor in which side surfaces of a laminate at which Ni-based internal electrodes are exposed are directly coated with Cu.

However, in this method, a plating solution tends to enter the laminate from the side surfaces at which the internal electrodes are exposed. When the laminate is heated at about 800° C. to remove water in the plating solution, Cu in a plated layer may be significantly diffused along the internal electrodes, causing Kirkendall voids in the plated layer. A Kirkendall void having an opening on the surface of the plated layer allows water to enter the laminate, thus causing deterioration in product lifetime under high temperature and high humidity.

SUMMARY OF THE INVENTION

Preferred embodiments of the present invention provide a monolithic ceramic electronic component and a method for manufacturing the monolithic ceramic electronic component that overcome the problems described above.

According to a preferred embodiment of the present invention, a method for manufacturing a monolithic ceramic electronic component includes the steps of preparing a laminate that includes laminated ceramic layers and a plurality of internal electrodes disposed between the ceramic layers, an end of each of the internal electrodes being exposed at a predetermined surface of the laminate, and forming a plated layer on the predetermined surface of the laminate to electrically connect the ends of the internal electrodes to each other.

To overcome the problems described above, the step of forming a plated layer includes a plating substep of depositing precipitates primarily composed of a specific metal on the end of each of the internal electrodes exposed at the predetermined surface of the laminate and growing the precipitates to coalesce into a continuous plated layer. The specific metal is different from that of the internal electrodes, and the same or substantially the same metal that defines the internal electrodes is distributed throughout the plated layer.

In the formation of the plated layer that is primarily composed of the specific metal and includes the same or substantially the same metal that defines the internal electrodes, the plating substep is preferably performed in a plating bath that includes one of ions, a complex of the specific metal and ions, or a complex of the same or substantially the same metal that defines the internal electrodes. Alternatively, the plating substep is preferably performed in a plating bath that includes ions or a complex of the specific metal and particles of the same or substantially the same metal that defines the internal electrodes.

A preferred embodiment of the present invention is more effective when the specific metal is Cu, and the metal defining the internal electrodes is Ni.

According to a preferred embodiment of the present invention, the step of forming a plated layer includes a first plating substep of depositing precipitates primarily composed of a specific metal on the end of each of the internal electrodes exposed at the predetermined surface of the laminate and growing the precipitates to coalesce into a continuous first plated sublayer, a second plating substep of forming a second plated sublayer primarily composed of the same or substantially the same metal that defines the internal electrodes, and a substep of heat-treating the laminate at a temperature of at least about 800° C. after the second plating substep. Preferably, the first plated sublayer preferably has an average thickness of about 10 μm or less, for example.

A monolithic ceramic electronic component manufactured by a method for manufacturing a monolithic ceramic electronic component according to a preferred embodiment of the present invention includes the following unique structural features. That is, according to preferred embodiments of the present invention, a monolithic ceramic electronic component includes a laminate that includes laminated ceramic layers and a plurality of internal electrodes disposed between the ceramic layers, an end of each of the internal electrodes being exposed at a predetermined surface of the laminate, and a first plated layer disposed directly on the predetermined surface of the laminate.

According to a preferred embodiment of the present invention, a specific metal that is a main component of the first plated layer is different from that of the internal electrodes, and the same or substantially the same metal that defines the internal electrodes is distributed throughout the first plated layer.

According to a preferred embodiment of the present invention, a second plated layer primarily composed of the same or substantially the same metal that defines the internal electrodes is preferably disposed on the first plated layer. More preferably, the first plated layer preferably has an average thickness of about 10 μm or less, for example.

According to a preferred embodiment of the present invention, in a method for manufacturing a monolithic ceramic electronic component, the same or substantially the same metal that defines internal electrodes is uniformly distributed in a plated layer disposed directly on a surface at which the internal electrodes are exposed. Thus, the diffusion of the main component metal of the plated layer in the internal electrodes is reduced during heat treatment. This prevents the generation of Kirkendall voids in the plated layer, and accordingly, the product lifetime in a load test under a high temperature and high humidity environment is improved.

In particular, when the main component of the plated layer is Cu and the plated layer includes Ni, and the main component of the internal electrodes is Ni, the Ni in the plated layer can more effectively prevent the migration of diffusive Cu, thus more effectively preventing the occurrence of Kirkendall voids.

Furthermore, interfaces between the internal electrodes and the ceramic layers exposed at the end surfaces can be sealed more tightly by heat treatment. This effectively prevents water from entering the laminate, which ensures high reliability.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

A monolithic ceramic electronic component 1 according to a first preferred embodiment of the present invention and a method for manufacturing the monolithic ceramic electronic component 1 are described below with reference to FIGS. 1 and 2.

Figure 1:
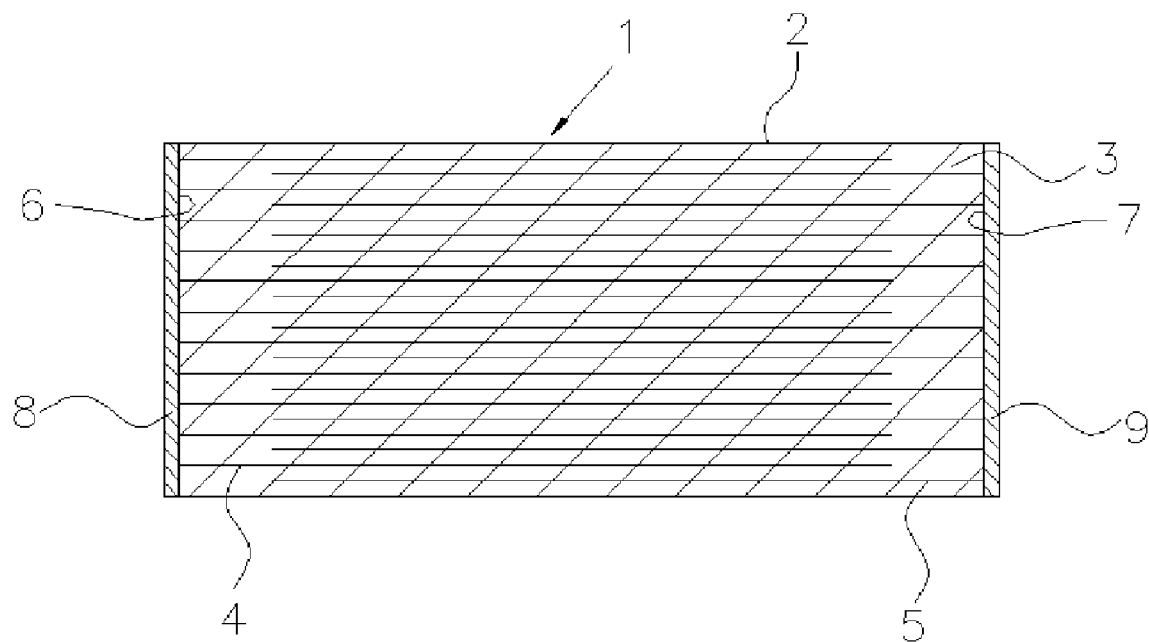
FIG. 1 is a cross-sectional view of a monolithic ceramic electronic component 1 according to a first preferred embodiment of the present invention.

As illustrated in the cross-sectional view of FIG. 1, the monolithic ceramic electronic component 1 includes a laminate 2, which includes laminated ceramic layers 3 and internal electrodes 4 and 5 alternately disposed between the ceramic layers 3. When the monolithic ceramic electronic component 1 is a monolithic ceramic capacitor, the ceramic layers 3 are composed of dielectric ceramic. An end of each of the internal electrodes 4 is exposed at an end surface 6 of the laminate 2. An end of each of the internal electrodes 5 is exposed at an end surface 7. External electrodes are formed on the end surfaces 6 and 7 to electrically connect the corresponding ends of the internal electrodes 4 and 5.

The external electrodes include first plated layers 8 and 9 formed of precipitates by wet plating, such as electroplating or electroless plating, for example. The first plated layers 8 and 9 are electrically connected directly to the internal electrodes 4 and 5. In other words, the first plated layers 8 and 9 do not include an electroconductive paste film, a vacuum-deposited film, or a sputtered film, for example.

A method for manufacturing the monolithic ceramic electronic component 1 illustrated in FIG. 1 will be described below also with reference to FIG. 2, with a particular emphasis on a method for forming the first plated layers 8 and 9, which are significantly related to the formation of Kirkendall voids.

Figure 2:
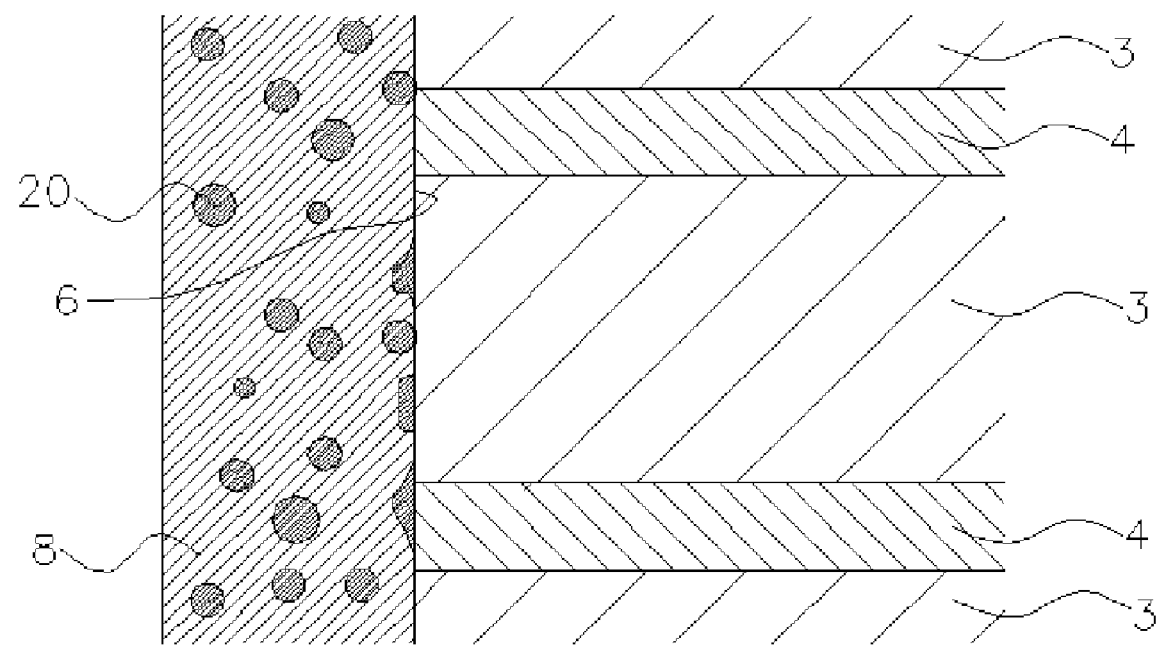
FIG. 2 is an enlarged fragmentary cross-sectional view of a laminate illustrated in FIG. 1.

FIG. 2 is a fragmentary enlarged cross-sectional view of a laminate 2 illustrated in FIG. 1 and illustrates the vicinity of the end surface 6 at which the internal electrodes 4 are exposed. The following description also applies to the end surface 7 and the internal electrodes 5 exposed at the end surface 7.

First, the laminate 2 is prepared. The laminate 2 includes the laminated ceramic layers 3 and the internal electrodes 4 and 5 alternately disposed between the ceramic layers 3. An end of each of the internal electrodes 4 is exposed at the end surface 6. An end of each of the internal electrodes 5 is exposed at the end surface 7. If the internal electrodes 4 or 5 are not sufficiently exposed at the end surface 6 or 7, the ceramic layers 3 are preferably ground by sandblasting or barrel polishing to expose the internal electrodes 4 or 5 at the end surface 6 or 7.

This is followed by a step of forming first plated layers 8 and 9 on the end surfaces 6 and 7 of the laminate 2 to electrically connect the corresponding ends of the internal electrodes 4 and 5 exposed at the end surfaces 6 and 7.

The step of forming first plated layers 8 and 9 includes a plating substep of depositing precipitates on the ends of the internal electrodes 4 and 5 exposed at the end surfaces 6 and 7 of the laminate 2 and growing the precipitates to coalesce into the continuous first plated layers 8 and 9 directly on the end surfaces 6 and 7.

Referring to FIG. 2, which is an enlarged view of FIG. 1, the same or substantially the same metal component 20 that defines the internal electrodes 4 is dispersed throughout the first plated layer 8. While the metal component 20 is partially unevenly distributed in FIG. 2, the metal component 20 may be more evenly distributed in an alloy. The content of the metal component 20 in the first plated layer 8 preferably ranges from about 0.5% to about 50% by weight and more preferably from about 5% to about 20% by weight, for example.

When the first plated layer 8 includes Cu as the main component metal and Ni as in the internal electrodes 4, Ni in the plated layer 8 can more effectively prevent the migration of diffusive Cu in heat treatment. While the combination of Cu and Ni is most preferred among the combinations of the main component metal of the first plated layer 8 and the same or substantially the same metal that defines the internal electrodes 4, another combination may also be used provided that the advantages of the preferred embodiments of the present invention are not compromised. For example, the main component of the first plated layer 8 may be Ag, and the metal defining the internal electrodes 4 may be Pd.

Figure 3:
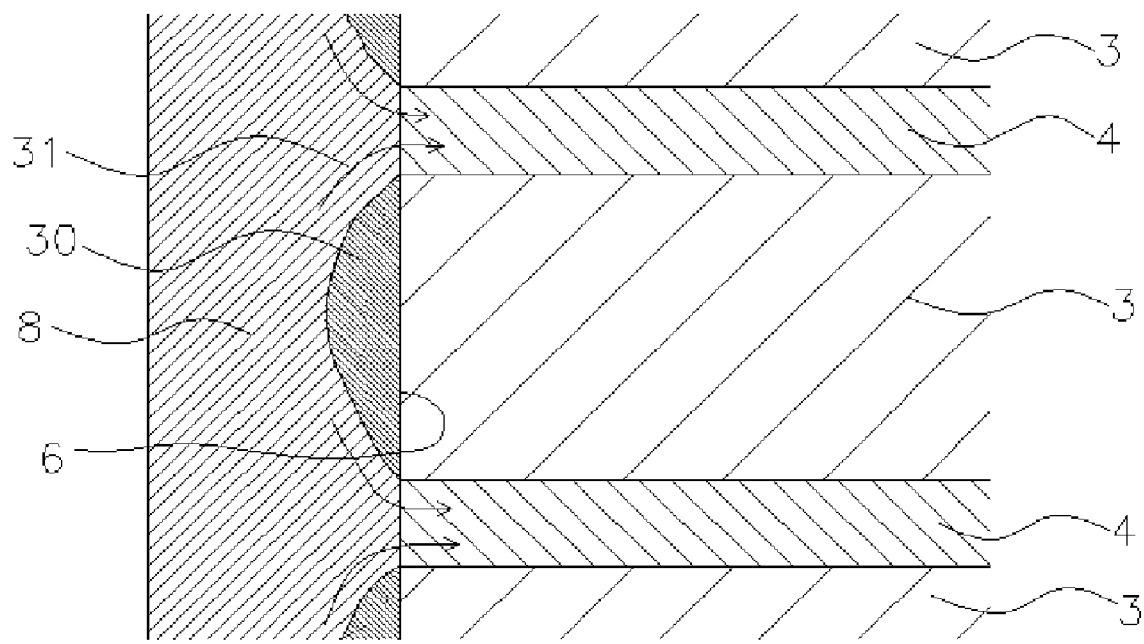
FIG. 3 is a cross-sectional view illustrating the formation of a Kirkendall void.

FIG. 3 shows a comparative embodiment in which a first plated layer 8 does not include the same or substantially the same metal that defines the internal electrodes 4. FIG. 3 is a similar view as shown in FIG. 2, except that the first plated layer 8 does not include the metal component 20.

In FIG. 3, the main component metal in the first plated layer 8 significantly diffuses into the internal electrodes 4 as indicated by an arrow 31 during heat treatment. This results in the formation of Kirkendall voids 30 in the vicinity of interfaces between the first plated layer 8 and the ceramic layers 3.

A method for forming the first plated layers 8 and 9 in the first preferred embodiment of the present invention is described below.

Plating is performed by immersing a container containing a laminate and an agitation medium in a plating bath including ions or a complex of plating metal, followed by the passage of electric current or the action of a reducing agent. Examples of plating include electrolytic barrel plating and electroless barrel plating each using a rotating barrel as the container, for example.

To incorporate the metal component 20 defining the internal electrodes 4 and 5 into the first plated layers 8 and 9, a plating bath may preferably include ions or a complex of the main component metal of the first plated layer 8 and ions or a complex of the metal component 20. During plating using such a plating bath, the main component metal of the first plated layer 8 and the same or substantially the same metal that defines the internal electrodes 4 and 5 are deposited on the exposed ends of the internal electrodes 4 and 5. The precipitates are then grown to form continuous first plated layers 8 and 9. This method is hereinafter referred to as "alloy plating". In the alloy plating, the components in a plating bath may be easily adjusted to the composition of the first plated layers 8 and 9.

Alternatively, to incorporate the same or substantially the same metal component 20 that defines the internal electrodes 4 and 5 into the first plated layers 8 and 9, a plating bath may include particles of the metal component 20. In this case, the deposition of the main component metal of the first plated layers 8 and 9 is accompanied by the inclusion of the surrounding particles of the metal component 20. Consequently, the first plated layers 8 and 9 include many particles of the metal component 20. This method is hereinafter referred to as "codeposition". Since only one metal component is involved in the deposition, it is easy to control the deposition.

Second Preferred Embodiment

Figure 4:
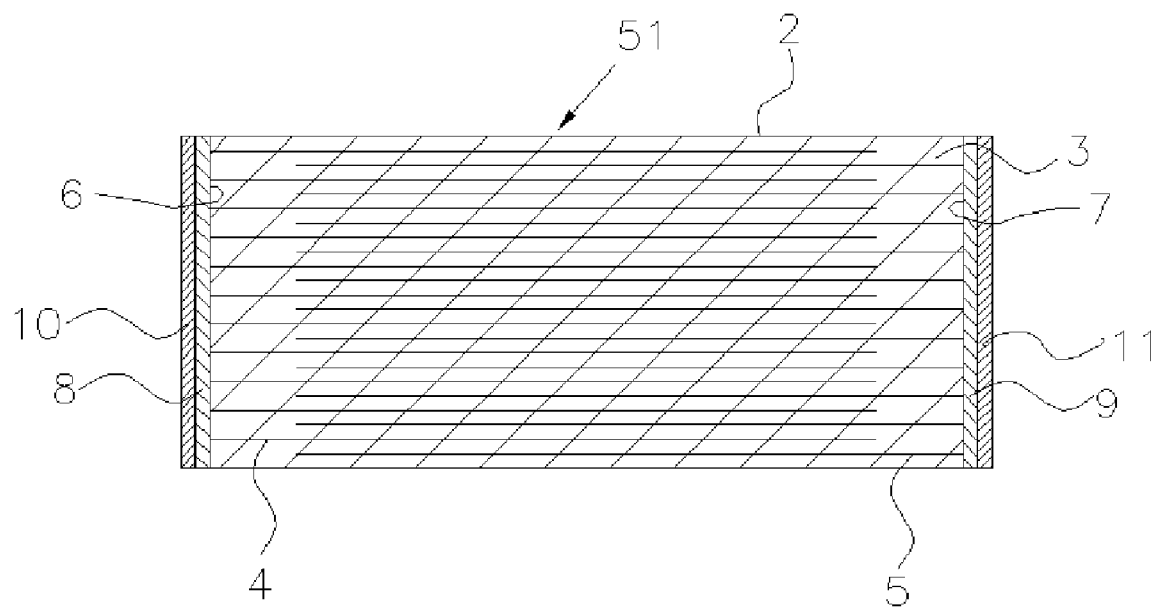
FIG. 4 is a cross-sectional view of a monolithic ceramic electronic component according to a second preferred embodiment of the present invention.
Figure 5:
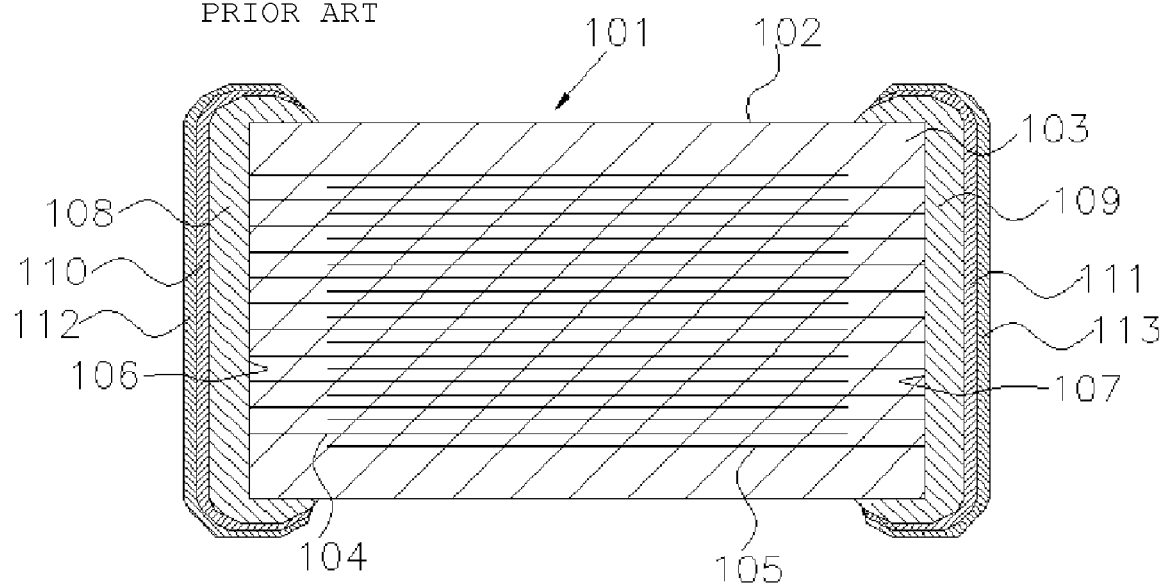
FIG. 5 is a cross-sectional view of a known monolithic ceramic electronic component.

FIG. 4 is a cross-sectional view of a monolithic ceramic electronic component 51 according to a second preferred embodiment of the present invention. A method for manufacturing the monolithic ceramic electronic component 51 is described below.

First, a laminate 2 is prepared as in the first preferred embodiment. First plated layers 8 and 9 are formed as in the first preferred embodiment on end surfaces 6 and 7 of the laminate 2 at which internal electrodes 4 and 5 are exposed. The first plated layers 8 and 9 are formed of a metal different from that of the internal electrodes 4 and 5.

The second preferred embodiment is different from the first preferred embodiment in that second plated layers 10 and 11 primarily composed of the same or substantially the same metal that defines the internal electrodes 4 and 5 are formed on the first plated layers 8 and 9 and that the laminate 2 is subsequently heat-treated at a temperature of at least about 800° C. The heat treatment allows a certain amount of the same or substantially the same metal that defines the internal electrodes 4 and 5 to diffuse from the second plated layers 10 and 11 into the first plated layers 8 and 9. Thus, the first plated layers 8 and 9 include the same or substantially the same metal that defines the internal electrodes 4 and 5, as in the first preferred embodiment. This prevents the main component metal of the first plated layers 8 and 9 from diffusing into the internal electrodes 4 and 5. The heat treatment at a temperature of at least about 800° C. should not be performed between the formation of the first plated layers and the formation of the second plated layers.

As the thickness of the first plated layers 8 and 9 decreases, the same or substantially the same metal that defines the internal electrodes 4 and 5 diffuses more rapidly from the second plated layers 10 and 11 to the first plated layers 8 and 9. This more effectively prevents the main component metal of the first plated layers 8 and 9 from diffusing into the internal electrodes 4 and 5. Preferably, the first plated layers 8 and 9 have an average thickness of about 10 μm or less, for example.

The combination of the main component of the first plated layers 8 and 9 and the main component of the second plated layers 10 and 11, that is, the main component of the internal electrodes 4 and 5 is preferably a combination of Cu and Ni, as in the first preferred embodiment.

Unlike the first preferred embodiment, in which the same or substantially the same metal that defines the internal electrodes is previously incorporated into the first plated layers 8 and 9, the diffusion of the metal component from the second plated layers 10 and 11 to the first plated layers 8 and 9 by the heat treatment is essential. Thus, an increase in the thickness of the first plated layers 8 and 9 reduces the diffusion rate of the metal component from the second plated layers 10 and 11. This may compromise the advantages of the preferred embodiments of the present invention.

Unlike the first preferred embodiment, the method according to the second preferred embodiment does not require particular plating, such as alloy plating or codeposition, for example. The method according to the second preferred embodiment is therefore more convenient than the method according to the first preferred embodiment.

The following are common in the first and second preferred embodiments.

The plating metal of the first plated layers 8 and 9 is preferably Cu to facilitate deposition throughout. In this case, the plating metal of the second plated layers 10 and 11 is preferably Ni to prevent solder leaching. When a monolithic ceramic electronic component according to preferred embodiments of the present invention is mounted by soldering, a plated layer primarily composed of Sn or Au is preferably formed on the surface of the monolithic ceramic electronic component.

The method for forming the first plated layers 8 and 9 utilizes the growth ability and spreadability of precipitates. To enhance the coalescence of the precipitates, the distance between adjacent internal electrodes is preferably about 10 μm or less for electroplating and about 20 μm or less for electroless plating, for example.

The exposed ends of the internal electrodes 4 and 5 are preferably recessed by no more than about 1 μm, for example, from the end surfaces 6 and 7 of the laminate 2 before the formation of the first plated layers 8 and 9. The recession of the exposed ends of more than about 1 μm makes electron supply to the exposed ends difficult, thus reducing precipitates. The recession may preferably be reduced by polishing, such as sandblasting or barrel polishing, for example.

Preferably, the ends of the internal electrodes 4 and 5 protrude from the end surfaces 6 and 7 of the laminate 2 before plating. The protrusions of the internal electrodes 4 and 5 are preferably formed by adjusting the conditions of polishing, such as sandblasting, for example. The polishing extends the protrusions along the end surfaces 6 and 7, thus reducing the distance between precipitates on the ends of adjacent internal electrodes. To enhance the coalescence of the precipitates, the distance between adjacent internal electrodes is preferably about 20 μm or less for electroplating and about 50 μm or less for electroless plating, for example.

While the external electrodes of a ceramic electronic component according to preferred embodiments of the present invention are substantially formed of only a plated layer, a paste electrode may also be formed provided that the paste electrode is not directly involved in the connection of the internal electrodes 4 and 5. For example, a thick paste electrode may be formed to extend the external electrodes to a surface adjacent to the end surfaces 6 and 7. This thick paste electrode can facilitate solder mounting and effectively prevent water from entering the laminate 2 from edges of the plated layers 8 and 9. Baking of the paste electrode can preferably be efficiently performed simultaneously with the heat treatment at a temperature of at least about 800° C., for example.

While the present invention has been described by the preferred embodiments with reference to the drawings, various modifications may be made without departing from the scope of the present invention.

For example, preferred embodiments of the present invention may also be applied to multilayer chip capacitors, multilayer chip inductors, and multilayer chip thermistors, preferred.

Thus, the ceramic layers of a monolithic ceramic electronic component may be formed of any material having an electrical insulating function. The ceramic layers may be formed of piezoelectric ceramic, semiconductor ceramic, or magnetic ceramic, as well as dielectric ceramic.

While the monolithic ceramic electronic component 1 includes a pair of external electrodes in FIG. 1, the monolithic ceramic electronic component 1 may include three or more external electrodes. For example, the monolithic ceramic electronic component 1 may be of an array type having two or more pairs of external electrodes.

Preferred embodiments of the present invention will be further described below with reference to examples.

Example 1

A laminate for use in a monolithic ceramic capacitor was prepared as a laminate of a monolithic ceramic electronic component. The laminate included ceramic layers made of barium titanate-based dielectric ceramic and internal electrodes primarily made of Ni. The laminate had a length of about 1.9 mm, a width of about 1.05 mm, and a height of about 1.05 mm. Each of the ceramic layers had a thickness of about 2.0 μm. The distance between adjacent internal electrodes on a surface at which the internal electrodes were exposed was about 4.0 μm.

Five hundred laminates were charged in a horizontal rotating barrel having a volume of about 290 mL. A hundred milliliters of electroconductive media having a diameter of about 1.3 mm were charged in the barrel. The rotating barrel was immersed in a Cu/Ni alloy plating bath controlled at a pH of about 8.7 and a temperature of about 25° C. An electric current was applied at a density of about 0.50 A/dm$^2$ for a predetermined period of time while the rotating barrel was rotated at a peripheral speed of about 2.6 m/min. The resulting first plated layer was mainly composed of a Cu/Ni alloy and had a thickness of about 4 μm. The Cu/Ni alloy plating bath had the following composition:

Copper diphosphate: about 15 g/L
Nickel diphosphate: about 5 g/L
Diphosphoric acid: about 120 g/L
Potassium oxalate: about 10 g/L After the laminates were removed from the barrel, the laminates were heat-treated at an oxygen concentration of about 5 ppm or less and a temperature of about 820° C. The in-out time of the heat treatment was about 30 minutes. The holding time at about 820° C. was about 270 seconds. Through these steps, a monolithic ceramic capacitor was prepared.

For 100 monolithic ceramic capacitors, a cross-section of an interface between the first plated layer and the laminate was observed with a scanning electron microscope (SEM). When the contact length between the first plated layer 8 and the ceramic layers 3 was reduced by at least about 30% due to the formation of a Kirkendall void, the sample was determined to be defective. The SEM observation showed that there was no defective sample.

Example 2

A laminate of a monolithic ceramic electronic component was prepared as in Example 1.

Five hundred laminates were charged in a horizontal rotating barrel having a volume of about 290 mL. A hundred milliliters of electroconductive media having a diameter of about 1.3 mm were charged in the barrel.

A Cu plating bath including dispersed Ni metal particles was prepared by charging Ni metal particles having an average size of about 0.5 μm at a concentration of about 7 g/L in the Cu plating bath controlled at a pH of about 8.7 and a temperature of about 25° C.

The rotating barrel was immersed in the Cu plating bath. An electric current was applied at a density of about 0.15 A/dm$^2$ for a predetermined period of time while the rotating barrel was rotated at a peripheral speed of about 2.6 m/min. The resulting first plated layer was primarily composed of Cu, included the Ni metal particles, and had a thickness of about 4 μm. The Cu plating bath had the following composition:

Copper diphosphate: about 15 g/L
Diphosphoric acid: about 120 g/L
Potassium oxalate: about 10 g/L After the laminates were removed from the barrel, the laminates were heat-treated as in Example 1. Through these steps, a monolithic ceramic capacitor was prepared.

For 100 monolithic ceramic capacitors, a cross-section was checked for a Kirkendall void with a scanning electron microscope (SEM), as in Example 1. The SEM observation showed that there was no defective sample.

Example 3

A laminate of a monolithic ceramic electronic component was prepared as in Example 1.

Five hundred of laminates were charged in a horizontal rotating barrel having a volume of about 290 mL. A hundred milliliters of electroconductive media having a diameter of about 1.3 mm were charged in the barrel.

The rotating barrel was immersed in a Cu plating bath controlled at a pH of about 8.7 and a temperature of about 25° C. An electric current was applied at a density of about 0.15 A/dm$^2$ for a predetermined period of time while the rotating barrel was rotated at a peripheral speed of about 2.6 m/min. The resulting first plated layer was primarily composed of Cu and had a thickness of about 2 μm. The Cu plating bath had the following composition:

Copper diphosphate: about 15 g/L
Diphosphoric acid: about 120 g/L
Potassium oxalate: about 10 g/L The rotating barrel including the laminates was washed with water and was immersed in a Ni plating Watts bath controlled at a pH of about 4.0 and a temperature of about 55° C. An electric current was applied at a density of about 0.50 A/dm$^2$ for a predetermined period of time while the rotating barrel was rotated at a peripheral speed of about 2.6 m/min. The resulting second plated layer was mainly composed of Ni and had a thickness of about 2 μm.

After the laminates were removed from the barrel, the laminates were heat-treated as in Example 1. Through these steps, a monolithic ceramic capacitor was prepared.

For 100 monolithic ceramic capacitors, a cross-section was checked for a Kirkendall void with a scanning electron microscope (SEM), as in Example 1. The SEM observation showed that there was no defective sample.

Example 4

A laminate of a monolithic ceramic electronic component was prepared as in Example 1.

Five hundred of laminates were charged in a horizontal rotating barrel having a volume of about 290 mL. A hundred milliliters of electroconductive media having a diameter of about 1.3 mm were charged in the barrel.

The rotating barrel was immersed in a Cu plating bath controlled at a pH of about 8.7 and a temperature of about 25° C. An electric current was applied at a density of about 0.15 A/dm$^2$ for a predetermined period of time while the rotating barrel was rotated at a peripheral speed of about 2.6 m/min. The resulting first plated layer was mainly composed of Cu and had a thickness of about 2 μm. The Cu plating bath had the following composition:

Copper diphosphate: about 15 g/L
Diphosphoric acid: about 120 g/L
Potassium oxalate: about 10 g/L The rotating barrel including the laminates was washed with water and was immersed in a Ni plating Watts bath controlled at a pH of about 4.0 and a temperature of about 55° C. An electric current was applied at a density of about 0.50 A/dm$^2$ for a predetermined period of time while the rotating barrel was rotated at a peripheral speed of about 2.6 m/min. The resulting second plated layer was primarily composed of Ni and had a thickness of about 2 μm.

The rotating barrel including the laminates was washed with water and was immersed in a Cu plating bath controlled at a pH of about 8.6 and a temperature of about 55° C. (C. Uyemura & Co., Ltd., a Pyrobrite (trade name) process). An electric current was applied at a density of about 0.30 A/dm$^2$ for a predetermined period of time while the rotating barrel was rotated at a peripheral speed of about 2.6 m/min. The resulting third plated layer was primarily composed of Cu and had a thickness of about 2 μm.

After the laminates were removed from the barrel, the laminates were heat-treated as in Example 1. Through these steps, a monolithic ceramic capacitor was prepared.

For 100 monolithic ceramic capacitors, a cross-section was checked for a Kirkendall void with a scanning electron microscope (SEM), as in Example 1. The SEM observation showed that there was no defective sample.

COMPARATIVE EXAMPLE

A laminate of a monolithic ceramic electronic component was prepared as in Example 1.

Five hundred of laminates were charged in a horizontal rotating barrel having a volume of about 290 mL. A hundred milliliters of electroconductive media having a diameter of about 1.3 mm were charged in the barrel.

The rotating barrel was immersed in a Cu plating bath controlled at a pH of about 8.7 and a temperature of about 25° C. An electric current was applied at a density of about 0.15 A/dm$^2$ for a predetermined period of time while the rotating barrel was rotated at a peripheral speed of about 2.6 m/min. The resulting first plated layer was mainly composed of Cu and had a thickness of about 4 μm. The Cu plating bath had the following composition:

Copper diphosphate: about 15 g/L
Diphosphoric acid: about 120 g/L
Potassium oxalate: about 10 g/L After the laminates were removed from the barrel, the laminates were heat-treated as in Example 1. Through these steps, a monolithic ceramic capacitor was prepared.

For 100 monolithic ceramic capacitors, a cross-section was checked for a Kirkendall void with a scanning electron microscope (SEM), as in Example 1. The SEM observation showed that all the samples were defective.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A monolithic ceramic electronic component comprising:
   a laminate including laminated ceramic layers and a plurality of internal electrodes disposed between the ceramic layers, an end of each of the plurality of internal electrodes being exposed at a predetermined surface of the laminate; and
   a first plated layer disposed directly on the predetermined surface of the laminate; wherein
   a specific metal that is a majority component of the first plated layer is different from that of the internal electrodes, and the same or substantially the same metal that defines the internal electrodes is distributed throughout the first plated layer as a minority component of the first plated layer; and
   the specific metal that is the majority component of the first plated layer is Cu and the metal that defines the internal electrodes and the minority component of the first plated layer is Ni.

2. The monolithic ceramic electronic component according to claim 1, wherein a second plated layer primarily composed of the same or substantially the same metal that defines the internal electrodes is located on the first plated layer.

3. The monolithic ceramic electronic component according to claim 2, wherein the first plated layer has an average thickness of about 10 μm or less.

* * * * *